United States Patent
Varanasi

(10) Patent No.: US 8,805,328 B2
(45) Date of Patent: Aug. 12, 2014

(54) PRIORITY-BASED PHONE CALL FILTERING

(75) Inventor: Anantakrishna Kanti Varanasi, Union City, CA (US)

(73) Assignee: QUALCOMM Incorporated, San Diego, CA (US)

(*) Notice: Subject to any disclaimer, the term of this patent is extended or adjusted under 35 U.S.C. 154(b) by 1185 days.

(21) Appl. No.: 11/863,174

(22) Filed: Sep. 27, 2007

(65) Prior Publication Data

US 2009/0088168 A1   Apr. 2, 2009

(51) Int. Cl.
| | |
|---|---|
| *H04M 1/663* | (2006.01) |
| *H04M 3/00* | (2006.01) |
| *H04M 3/42* | (2006.01) |
| *H04W 40/00* | (2009.01) |
| *H04M 1/66* | (2006.01) |
| *H04M 1/00* | (2006.01) |

(52) U.S. Cl.
USPC ........ 455/411; 455/412.2; 455/415; 455/418; 455/445; 455/567; 379/210.02

(58) Field of Classification Search
USPC .......................... 455/415, 417, 445, 410–411, 455/412.1–412.2, 414.1, 413, 418–420, 455/432.3, 466, 507, 512, 514, 517, 550.1, 455/551, 567; 379/210.02–210.03, 211.01, 379/201.07–201.08, 201.11, 207.1, 207.13, 379/207.15, 208.01
See application file for complete search history.

(56) References Cited

U.S. PATENT DOCUMENTS

| | | | |
|---|---|---|---|
| 5,329,578 A | 7/1994 | Brennan et al. | |
| 6,018,572 A | 1/2000 | Foladare et al. | |
| 6,665,534 B1 * | 12/2003 | Conklin et al. | 455/417 |
| 2005/0064854 A1 * | 3/2005 | Jang | 455/415 |
| 2006/0034445 A1 * | 2/2006 | Shelton | 379/266.01 |
| 2006/0094404 A1 * | 5/2006 | Burgess | 455/412.1 |
| 2006/0210033 A1 | 9/2006 | Grech et al. | |

FOREIGN PATENT DOCUMENTS

| | | |
|---|---|---|
| EP | 1471764 A2 | 10/2004 |
| EP | 1478166 A1 | 11/2004 |
| JP | 2005101819 | 4/2005 |
| KR | 10-2006-0050671 A | 5/2006 |
| KR | 20060097154 A | 9/2006 |
| KR | 100677493 | 1/2007 |
| WO | WO-2007005660 A2 | 1/2007 |

OTHER PUBLICATIONS

PCT International Search Report and Written Opinion, PCT Application No. PCT/US2008/077110, Dec. 31, 2008, 8 pages.
Supplementary European Search Report—EP08834023—Search Authority—Munich—Sep. 19, 2011.

* cited by examiner

*Primary Examiner* — Meless Zewdu
(74) *Attorney, Agent, or Firm* — Mahamedi Paradice LLP

(57) ABSTRACT

A mobile phone filters phone calls based on priority. The mobile phone determines a call priority of an incoming phone call based on the caller's telephone number. The mobile phone also determines a threshold priority for the current time period based on a priority schedule. The mobile phone compares the call priority with the threshold priority to determine whether to block the incoming call. If the mobile phone blocks the incoming phone call, it may transmit a message to the caller suggesting a time for the caller to make the phone call again.

16 Claims, 6 Drawing Sheets

500

| Name | Caller Priority | Phone Number |
|---|---|---|
| Alice | 2 | (123) 456-7890 |
| Joan | 3 | (234) 567-8901 |
| Joel | 1 | (345) 678-9012 |
| Mary | 5 | (456) 789-0123 |
| Mike | 3 | (567) 890-1234 |
| Peter | 4 | (678) 901-2345 |
| Smith | 2 | (789) 012-3456 |
| Tom | 4 | (890) 123-4567 |

Figure 5

PRIORITY-BASED PHONE CALL FILTERING

BACKGROUND

The disclosure generally relates to the field of mobile communication, in particular to phone call filtering based on priority.

Mobile phones have become part of everyday life, and their usage is on the rise. As a result, more and more mobile phone users treat their mobile phones as their primary phones. Because most mobile phone users carry their mobile phones with them, they can receive phone calls all the time. However, mobile phone users may not want to be interrupted by unimportant phone calls during certain periods of time (e.g., business meetings, family dinners, or sleeping time).

Traditionally, mobile phone users filter phone calls by manually screening the callers. For example, a mobile phone user may determine whether to answer an incoming call by checking the phone number of the caller. If the user deems the incoming call unimportant (e.g., with low priority) and decides not to answer it, he or she may press a button on the mobile phone to terminate (or mute) the incoming call. This process is interruptive because phone rings (or vibrations) alerting the phone calls are distractive (e.g., waking users up), and users must manually operate the mobile phone to filter the phone calls.

Alternatively, mobile phone users may turn off (or mute) their mobile phones to avoid interruptions caused by unimportant phone calls. However, this approach blindly and indiscriminately blocks all income calls, including important ones (e.g., phone calls with high priority) that the users intend to answer. As a result, mobile phone users risk the unintended consequence of missing important phone calls.

From the above, there is a need in the art for a system and method for filtering phone calls with minimal user intervention.

SUMMARY

Embodiments of the invention enable a mobile phone to filter incoming calls based on priority. In one embodiment, a mobile phone determines a priority of an incoming phone call (the call priority) based on the caller's telephone number. The mobile phone also determines a threshold priority for the current time period based on a priority schedule. The mobile phone compares the call priority with the threshold priority to determine whether to block the incoming call. If the threshold priority exceeds the call priority, the mobile phone blocks the phone call. If the mobile phone blocks the incoming call, it may transmit a message to the caller suggesting a time for the caller to make the phone call again.

Embodiments of the invention may enable mobile phones to filter incoming calls automatically based on priority with no or minimal user intervention. Also, because information needed for a mobile phone to conduct the filtering (e.g., caller ID, contact list, schedule/calendar information) is already available in many mobile phones, the mobile phone may implement call filtering based on priority with no or minimal additional support.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings, in which:

FIG. 5 illustrates one embodiment of a contact list, including priority information, for a mobile computing device.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Mobile Computing Device

Figure 1:
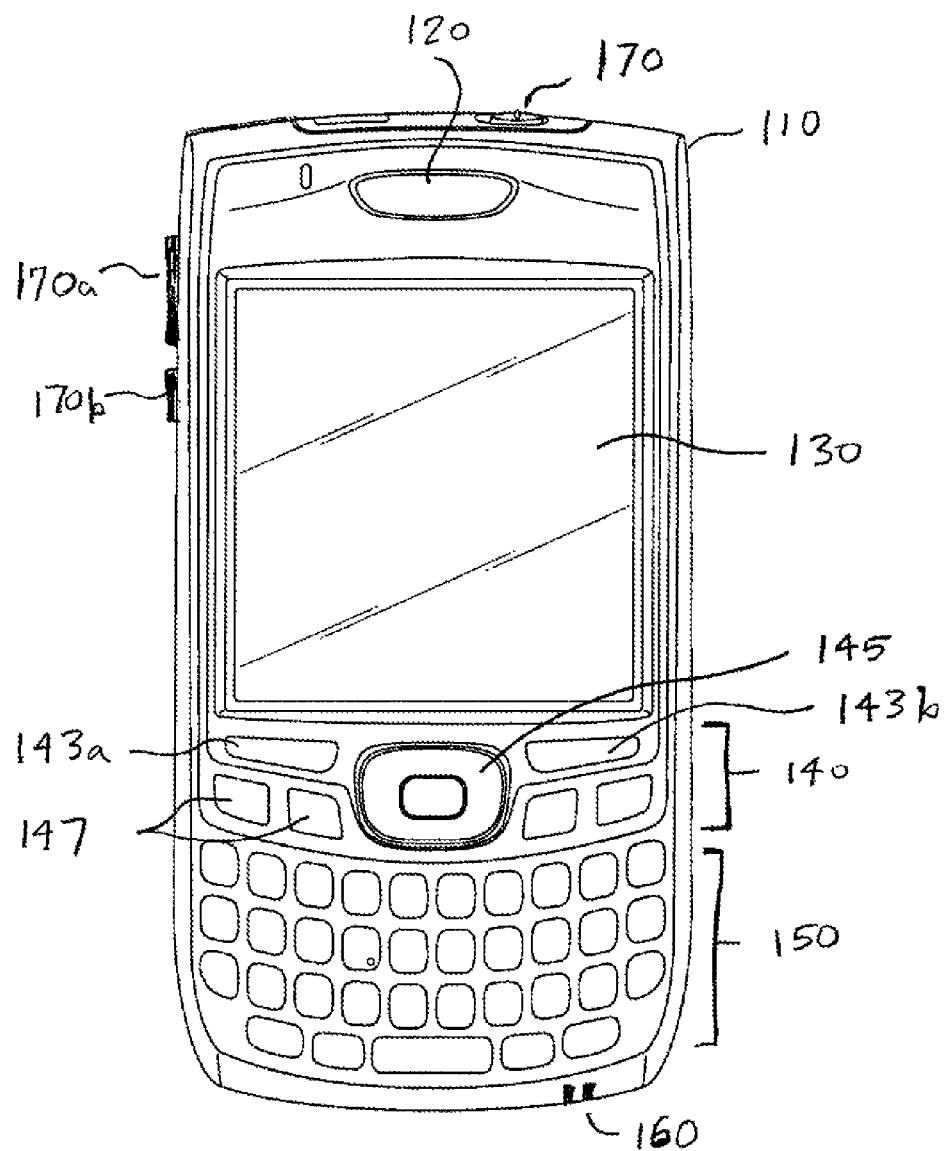
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality. Moreover, the principles disclosed herein may also be applied to other devices, such as personal digital assistants (PDAs), media players and other similar devices.

The mobile computing device 110 is configured to be of a form factor that is convenient to hold in a user's hand, for example, a personal digital assistant (PDA) or a smart phone form factor. For example, in one embodiment the mobile computing device 110 can have dimensions ranging from 7.5 to 15.5 centimeters in length, 5 to 12.75 centimeters in width, 0.64 to 2.2 centimeters in height and weigh between 55 and 230 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is e.g., 5) navigation ring (or joystick) 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dial pad) or a numeric keypad integrated with an alpha or alphanumeric keypad (e.g., a keyboard with consecutive keys of QWERTY, AZERTY, or other equivalent set of keys on a keyboard or a Dvorak keyboard).

Although not illustrated, it is noted that the mobile computing device 110 also may include an expansion slot 125. The expansion slot 125 is configured to receive and support expansion cards (or media cards), which may include memory cards such as CompactFlash™ cards, SD cards, XD cards, Memory Sticks™, MultiMediaCard™, SDIO, and the like.

Example Mobile Computing Device Architectural Overview

Figure 2:
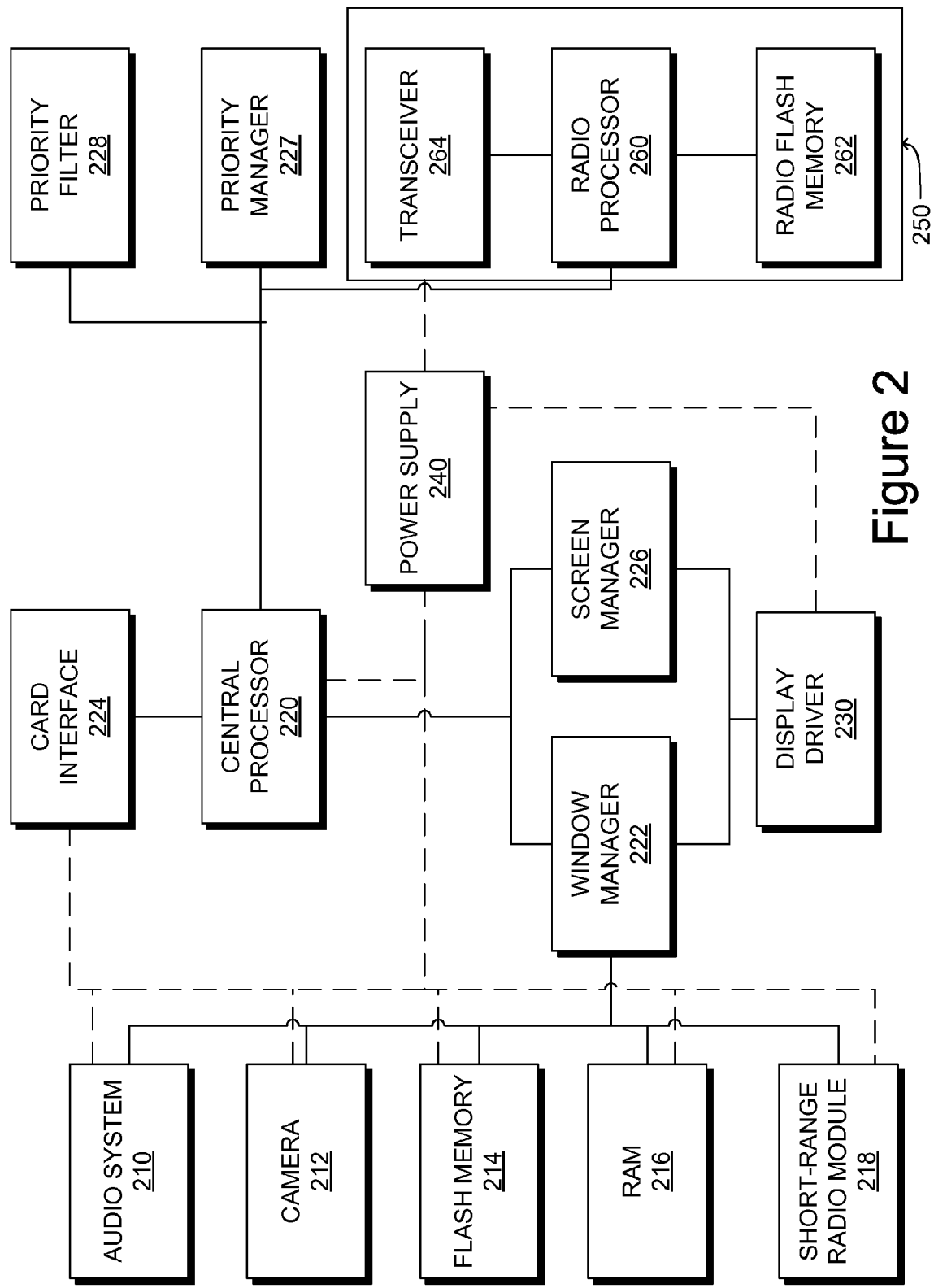
FIG. 2 illustrates one embodiment of an architecture of a mobile computing device.

Referring next to FIG. 2, a block diagram illustrates one embodiment of an architecture of a mobile computing device 110 with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, random-access memory (RAM) 216, short range radio module 218 (e.g., Bluetooth, Wireless Fidelity (WiFi) component), a window manager 222, a screen manager 226, a priority manager 227, and a priority filter 228. The power supply 240 powers the central processor 220, the radio subsystem 250 and a display driver 230 (which may be contact- or inductive-sensitive). The power supply 240 may correspond to a battery pack (e.g., rechargeable) or a power-line connection or component.

In one embodiment, the window manager 222 comprises a software or firmware instructions for processes that initialize a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to display and modify a window, such as resizing the window along one axis, moving the window along one axis or any other command altering the appearance or position of the window, and modifies the window accordingly.

The screen manager 226 comprises a software or firmware instructions for processes that manage content displayed on the screen 130. In one embodiment, the screen manager 226 monitors and controls the physical location of data displayed on the screen 130 and which data is displayed on the screen 130. The screen manager 226 alters or updates the location of data on the screen 130 responsive to input from the central processor 220, to modify the screen 130 appearance. In one embodiment, the screen manager 226 also monitors and controls screen brightness and transmits control signals to the central processor 220 to modify screen brightness and power usage to the screen 130.

The priority manager 227 comprises a software or firmware instructions for processes that manage priorities used to filter phone calls. In one embodiment, a priority schedule and a call priority are used to filter phone calls. The priority schedule determines priority levels associated with different time periods (or time intervals) and is used to determine a threshold priority of the mobile computing device 110 for the current time period. A call priority is a priority level for an incoming call. The call priority is determined based on a priority level associated with the caller (e.g., a phone number, a Skype™ identifier, a caller name). The priority schedule may be stored together with calendar data. The priority levels of callers may be stored together with contact data. The priority levels (of the priority schedule and/or of the callers) may be stored in flash memory 214, RAM 216, and/or memory cards in the expansion slot 125. The priority levels may be inputted by users via input components such as keypad, or received from an external source via transmission components such as the radio subsystem 250. The priority manager 227 may calculate or adjust the priority levels according to a set of priority rules. The set of priority rules may be predefined or provided by users.

The priority filter 228 comprises a software or firmware instructions for processes that filter incoming calls based on priority. In one embodiment, the priority filter 228 determines a call priority for an incoming call and a threshold priority for the current time period. The priority filter 228 compares the call priority and the threshold priority to determine whether to block the incoming call. If the priority filter 228 determines to block the incoming call, it may forward the incoming call to a voicemail or terminate the incoming call. If the priority filter 228 determines not to block the incoming call, it may notify a phone application (not shown) to alert the user of the incoming call.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot 125. The card interface 224 transmits data and/or instructions between the central processor 220 and an expansion card or media card included in the expansion slot 125. The card interface 224 also transmits control signals from the central processor 220 to the expansion slot 125 to configure an expansion card or media card included in the expansion slot 125.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Priority Schedule

Phone calls demand instant attention and force users to put aside their tasks at hand and respond to the incoming calls. For various reasons, people may prefer not to be interrupted by phone calls during certain time periods (or time intervals). In one embodiment, mobile phone users may reduce interruptions due to certain phone calls by setting up a priority schedule for their mobile phones. In this way, unimportant or otherwise undesired phone calls may be blocked during certain time periods.

In one embodiment, a user may set priority levels for particular time periods. Such priority levels and time periods are collectively called a priority schedule. A priority level may be an integer within a range. In the following examples, it is assumed that a priority level may be any integer between 1 and 5, 1 being the lowest and 5 being the highest. Phone calls with low priorities are blocked during time periods of high priority levels. Therefore, a user who prefers less interruptions during a certain time period may assign a high priority level to that time period, such that only important phone calls (phone calls with high priority) go through (e.g., are alerted) during that time period.

Figure 3:
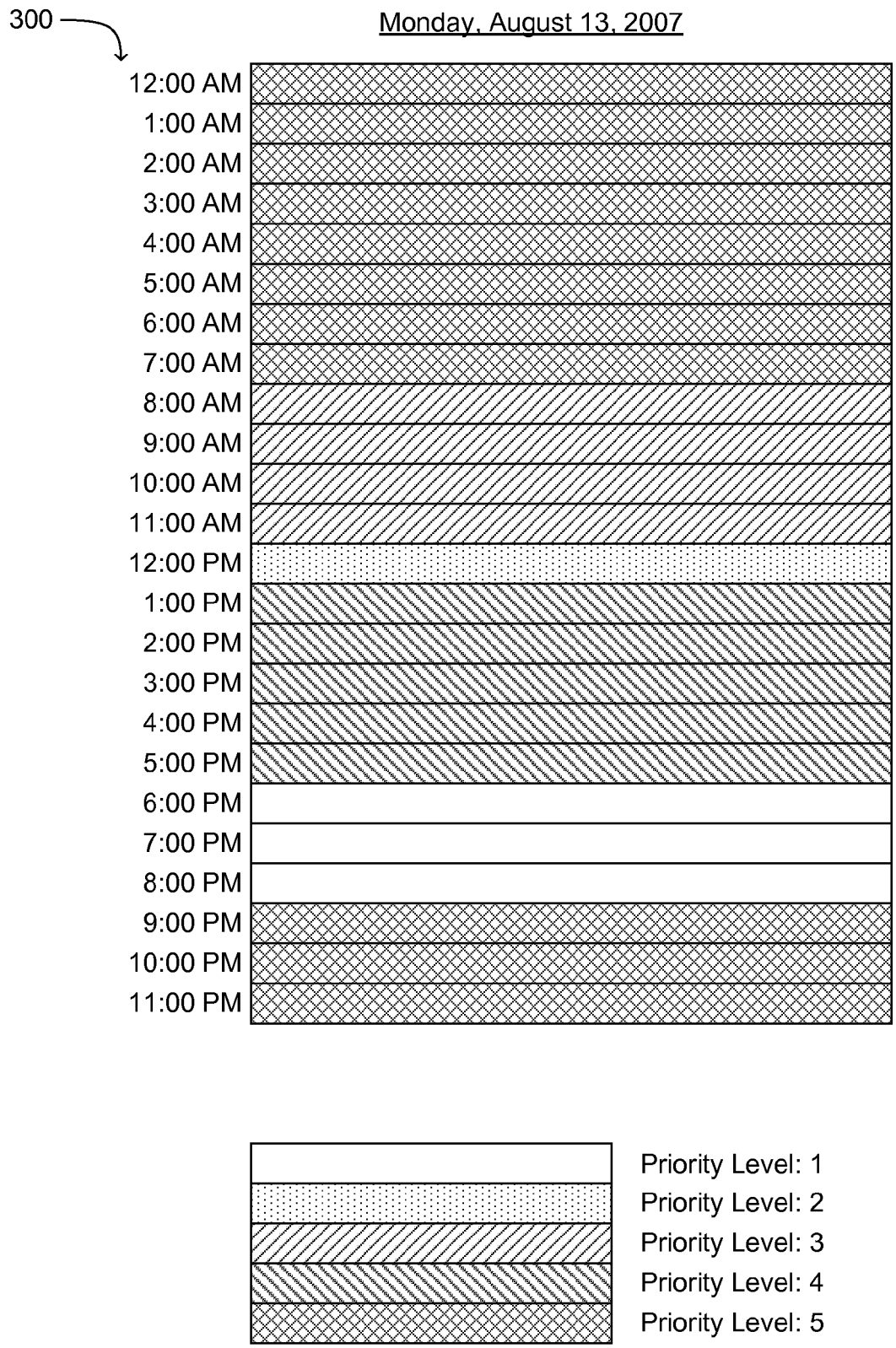
FIG. 3 is a diagram of one embodiment of a priority schedule for a mobile computing device during a day.

FIG. 3 illustrates one embodiment of a priority schedule 300 during a day. As illustrated, the time periods between 12:00 AM and 8:00 AM and between 9:00 PM and 12:00 AM of the next day (collectively called the sleeping time) have a priority level of 5. The time period between 1:00 PM and 6:00 PM (the afternoon working time) has a priority level of 4. The time period between 8:00 AM and 12:00 PM (the morning working time) has a priority level of 3. The time period between 12:00 PM and 1:00 PM (the lunch time) has a priority level of 2. The time period between 6:00 PM and 9:00 PM (the family time) has a priority level of 1.

A mobile phone may filter phone calls based on the priority schedule 300. As is described in greater detail below, a mobile phone determines a call priority for an incoming call based on information about the caller, and determines a threshold priority for the current time period based on a priority schedule. The mobile phone blocks incoming calls with call priorities below the threshold priority. Following the priority schedule 300, the mobile phone will block most of the phone calls (except those with high priority) during the sleeping time, and let all phone calls go through (assuming all phone calls have a priority level of 1 or higher) during the family time.

A mobile phone user may create (or adjust) a priority schedule to suit his need. As the example illustrated in FIG. 3, the user may prioritize the sleeping time over the family time, or vice versa.

In one embodiment, mobile phone users may set a base priority schedule (or default priority schedule) to filter phone calls absent of special arrangements (e.g., calendar entries such as appointments and meetings). For example, the priority schedule 300 may be a base priority schedule. Mobile phone users may set a base priority schedule for different days of the week (or month or year). For example, base priority schedules for weekends may be different from those for weekdays.

Mobile phone users may set priority levels for calendar entries such as scheduled appointments different from the priority level(s) in the base priority schedule. The users may set the priority levels either on a per appointment basis or based on the type of the appointment. For example, a user may assign a priority level to an appointment when entering the appointment in his calendar. As another example, the user may assign a universal priority level applicable to all medical appointments.

Figure 4:
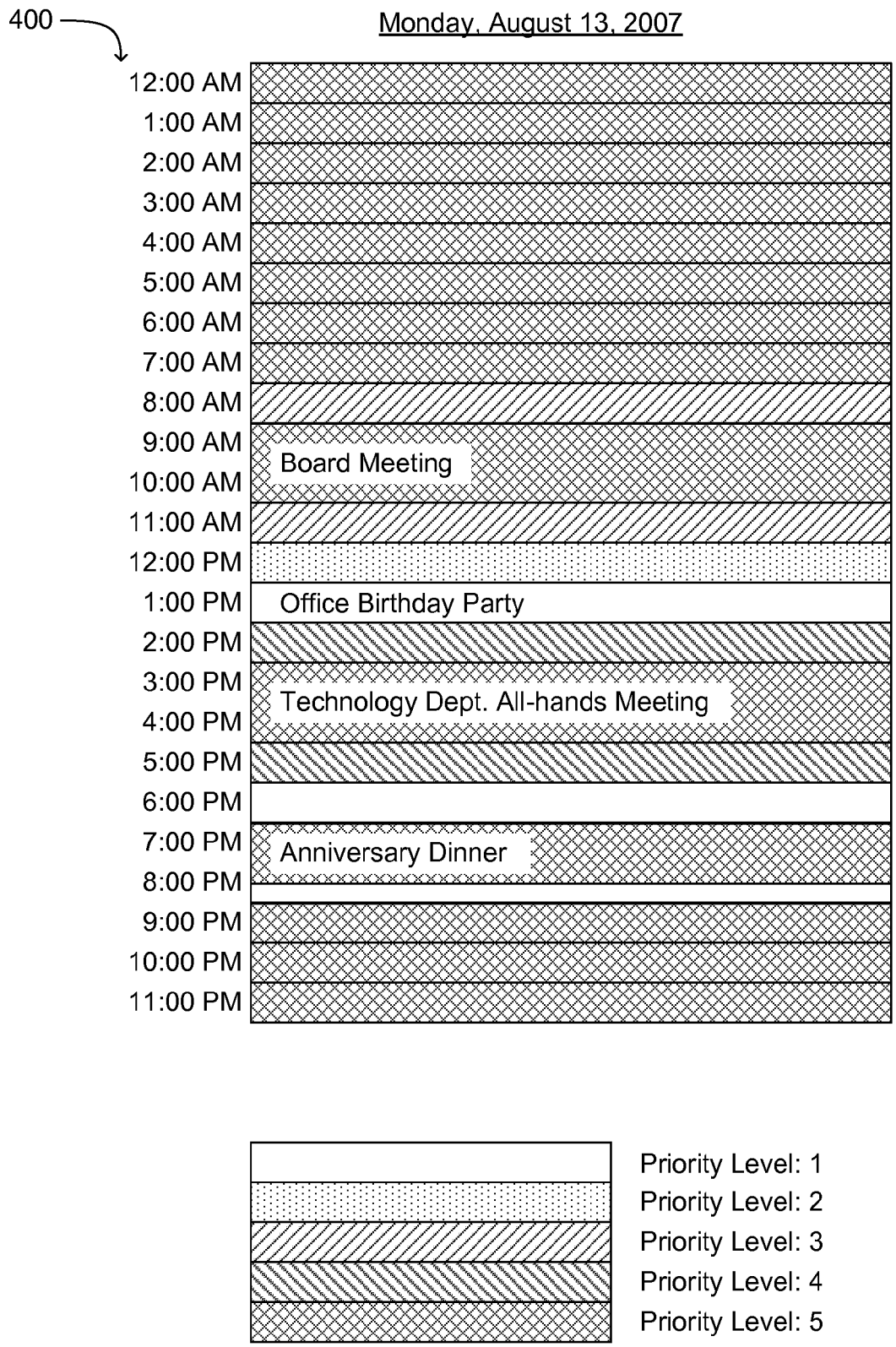
FIG. 4 is a diagram of one embodiment of a priority schedule with scheduled events and their corresponding priority levels, for a mobile computing device during a day.

FIG. 4 illustrates one embodiment of a priority schedule 400 during a day. Different from the schedule 300, the schedule 400 includes several appointments that override (or alter) the default priority levels as set forth in the base priority schedule 300. A board meeting is scheduled between 9:00 AM and 11:00 AM, which is assigned a priority level of 5, overriding the default priority of 3 for the same time period as set forth in the schedule 300. An office birthday party is scheduled between 1:00 PM and 2:00 PM, which is assigned a reduced priority level of 1 (compare to the default priority of 4). A technology department all-hands meeting is scheduled between 3:00 PM and 5:00 PM, which is assigned an enhanced priority level of 5. An anniversary dinner is scheduled between 7:00 PM and 8:30 PM, which is assigned an enhanced priority level of 5.

In one embodiment, the priority manager 227 may automatically adjust priority levels for scheduled appointments based on priority rules. A priority rule includes logic designed to adjust priority levels of calendar entries. For example, a mobile phone user may set a priority rule that meetings should have a priority level of 5 (the meeting priority rule). The priority manager 227 may process the scheduled appointments in the schedule 400 to determine that the "board meeting" and the "technology dept. all-hands meeting" are meetings (e.g., by using natural language processing technologies). Subsequently, when the meetings are scheduled to start, the priority manager 227 may apply the meeting priority rule and raise the threshold priority to 5 from the default priority level. When the meetings are scheduled to end, the priority manager 227 may resume the threshold priority to the priority level as indicated by the base priority schedule 300.

In one embodiment, the mobile phone may enable the user to adjust temporarily the threshold priority. For example, the user may press a button (or slider or switch) to put the mobile phone in a high-priority or low-priority mode for a predefined period of time (e.g., 5 minutes). The high-priority mode is associated with an increased threshold priority, and the low-priority mode is associated with a decreased threshold priority. The threshold priorities associated with these modes overrides the priority schedule and priority rules during the predefined period of time.

Call Priority

Mobile phone users often screen phone calls by checking the callers' telephone numbers. For various reasons, a mobile phone user may deem phone calls from one telephone number more important than phone calls from another. In one embodiment, mobile phone users may quantify the importance of phone calls from a telephone number (or a caller) by associating a priority level with the telephone number. All incoming calls from a telephone number will have a call priority determined by the priority level associated with the telephone number.

In one embodiment, a user may set a priority level to a phone number. When a mobile phone receives an incoming call from a telephone number, it determines the priority level associated with the telephone number as the call priority and determines the threshold priority for the current time period according to a priority schedule. If the threshold priority exceeds the call priority, the mobile phone blocks the incoming call.

FIG. 5 illustrates one embodiment of a priority contact list 500 for a mobile phone. As illustrated, the priority contact list 500 contains contact names, associated priority levels, and telephone numbers. For example, FIG. 5 shows that Alice's phone number (123) 456-7890 has a priority level of 2.

In one embodiment, the priority manager 227 automatically determines a phone number's priority level based on information associated with the phone number. For example, a mobile phone user may set a priority rule that all phone numbers associated with employees of XYZ Corp. should have a priority level of 5 (the co-worker priority rule). The priority manager 227 may process information associated with phone numbers and automatically assigns a priority level 5 to those phone numbers associated with XYZ Corp. employees based on the co-worker priority rule. In one embodiment, phone numbers not associated with a priority level are assigned a default priority level (e.g., the lowest priority level).

System Operation

Figure 6:
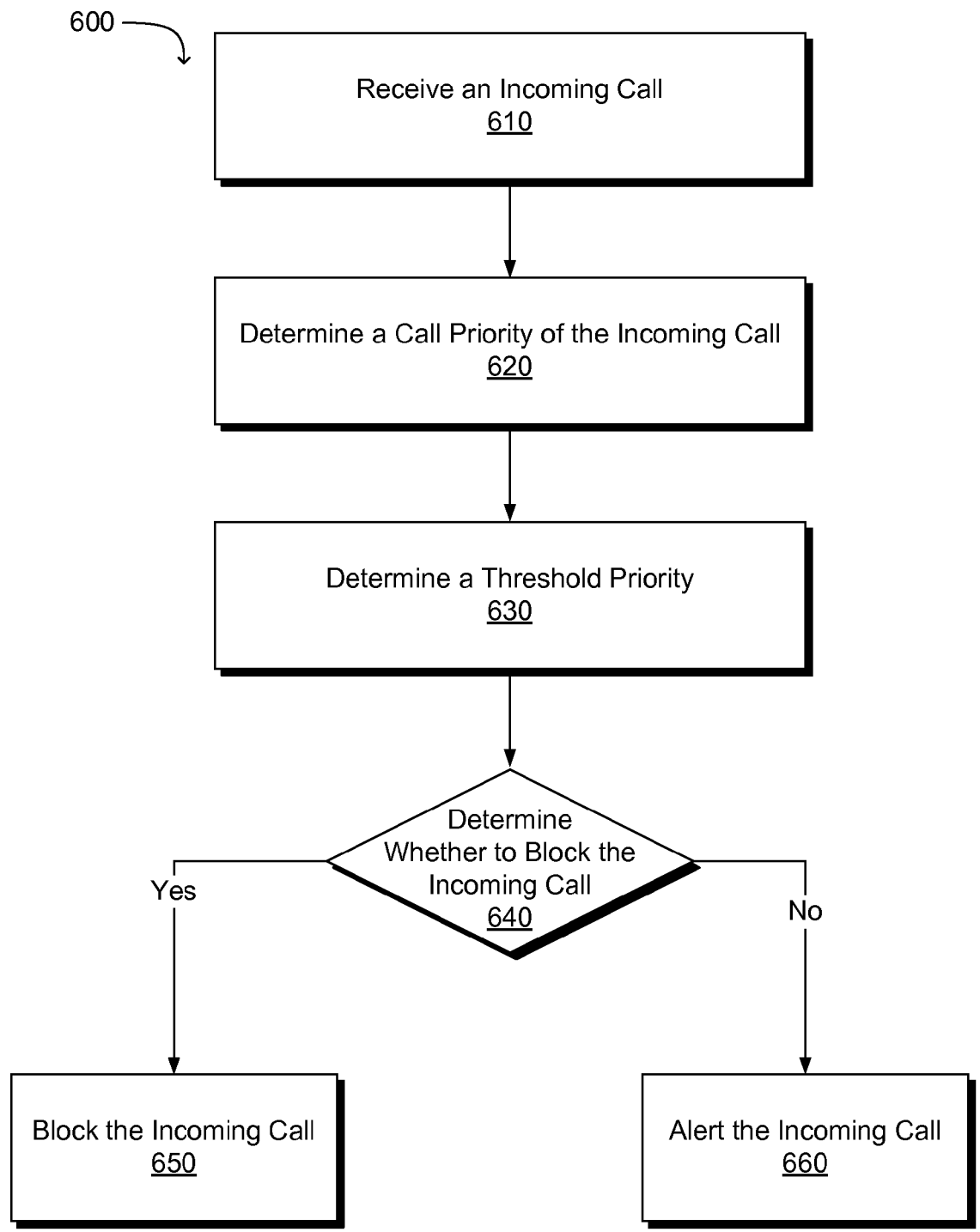
FIG. 6 illustrates one embodiment of a method for filtering phone calls based on priority.

FIG. 6 is a simplified flow diagram illustrating an example method 600 for a mobile phone to filter phone calls based on priority. In one example, the mobile phone is the mobile computing devices 110, and the steps of the method 600 are implemented by the central processor 220 executing software instructions that cause the described actions. One or more portions of the method 600 may be implemented in embodiments of hardware and/or software, or combinations thereof. For example, instructions for performing the described actions are embodied or stored within a computer readable medium, e.g., the flash memory 214 or the RAM 216, and are executable by a processor, such as the central processor 220. Furthermore, those of skill in the art will recognize that other embodiments can perform the steps of FIG. 6 in different orders. Moreover, other embodiments can include different and/or additional steps than the ones described herein.

Initially, the mobile phone sets a priority schedule and a priority contact list. The priority schedule and the priority contact list may be set in the mobile phone or retrieved from local storage (e.g., the flash memory 214 and/or the RAM 216) or external sources through a network. For example, the mobile phone may synchronize with a computer to retrieve the priority schedule and/or the priority contact list that are set and/or stored in the computer.

The mobile phone receives 610 an incoming phone call and determines 620 a call priority of the incoming call. The mobile phone determines 620 the call priority by looking up the telephone number of the incoming call in the priority contact list. If the telephone number (or the associated caller) is associated with a priority level, the mobile phone uses the priority level as the call priority of the incoming call. Otherwise the mobile phone may determine a priority level for the telephone number and the incoming call (e.g., by applying priority rules) or assign the call priority a default priority level (e.g., the lowest priority level). For example, the mobile phone may assign the default call priority to incoming calls blocking the callers' telephone numbers and/or incoming calls from telephone numbers not in the priority contact list.

The mobile phone determines 630 a threshold priority based on the priority schedule. As described above with respect to FIG. 4, the mobile phone may keep track of scheduled meetings and appointments and automatically adjust the threshold priority during these time intervals.

The mobile phone determines 640 whether to block the incoming call. The mobile phone may execute a filter to make the determination 640. The filter may be a stand alone applet or may be embedded in or integrated with another application in the mobile phone (e.g., a phone application, a contact manager, or a calendar manager). The mobile phone compares the call priority with the threshold priority. If the threshold priority exceeds the call priority, the mobile phone determines 640 to block the phone call.

If the mobile phone determines 640 to block the incoming call, the mobile phone blocks 650 the incoming call by not alerting (e.g., ringing, vibrating, flashing) its user of the phone call. In one embodiment, the mobile phone may simply drop the phone call, simulate the mobile phone being busy, direct the phone call to a voice mail, and/or return a message (via Short Message Service (SMS) or email service) to the caller. The greeting of the voice mail and/or the message may suggest a time period for the caller to make the call again. The suggested time period may be determined based on the priority schedule and the call priority. For example, if the call priority is 2, then the short message may list time periods during which the mobile phone will not block incoming calls with call priority of 2.

If the mobile phone determines 640 not to block the phone call, it alerts 660 the mobile phone user of the phone call. For example, the mobile phone may ring, vibrate or flash, based on user preference (or setting), to alert the mobile phone user of the incoming call.

Example Process

The principles described above can be further illustrated through the following example of an operation of a mobile phone.

Initially, the mobile phone receives 610 a phone call from (678) 901-2345 at 3:05 PM. The mobile phone looks up the priority contact list 500 as illustrated in FIG. 5 and determines that the phone number is associated with a priority level 4. Therefore, the mobile phone determines 620 that the call priority of the incoming call is 4.

The mobile phone further determines 630 a threshold priority based on the priority schedule 400 as illustrated in FIG. 4. The mobile phone determines 630 that the user is in the scheduled technology department all-hands meeting and that the threshold priority is 5.

The mobile phone compares the threshold priority (5) and the call priority (4) and determines 640 to block the incoming call.

The mobile phone blocks 650 the phone call and checks the priority schedule 400 to identify time intervals associated with priority levels not exceeding the call priority (4)-5 PM through 7 PM and 8:30 PM through 9 PM. The mobile phone generates a text message "I apologize for missing your call. Please call me between 5 PM and 7 PM or 8:30 PM and 9 PM." and sends the message to the caller's phone using SMS.

OTHER EMBODIMENTS

Phone calls from the same telephone number may have different importance. In one embodiment, callers may set priorities to outgoing calls to indicate the importance to the recipient. Recipients' mobile phone may filter incoming calls based on the priorities callers assign to the phone calls.

In one embodiment, a caller may set a priority level to an outgoing call (hereinafter called the suggested priority) and transmit the suggested priority to the recipient's phone. The caller's mobile phone may encode the suggested priority in a connection packet and send the connection packet to the recipient's mobile phone (e.g., through a mobile telephone network). If the caller does not set the suggested priority on an outgoing call, the suggested priority may be set a default value (e.g., the lowest suggested priority). The recipient's mobile phone may extract the suggested priority from the connection packet.

In one embodiment, instead of a single priority level, a mobile phone user (the recipient) may set a range of priority levels (hereinafter called the allowable range) for a telephone number to restrict the call priority of incoming calls from the telephone number to be within the allowable range. The allowable range may be defined by a maximum allowable priority level and a minimum allowable priority level. For example, the recipient may assign a maximum allowable priority level 4 and a minimum allowable priority level 2 to a telephone number. As a result, incoming calls from this telephone number will have call priorities between 2 and 4, depending on the suggested priorities assigned by the caller, even if the suggested priority is outside the allowable range.

The recipient's mobile phone determines the call priority of an incoming call based on the suggested priority and the allowable range associated with the telephone number of the incoming call. In one embodiment, the mobile phone uses the value of the suggested priority as the call priority if the suggested priority falls within the allowable range. If the suggested priority falls outside the allowable range, the mobile phone uses the maximum allowable priority level as the call priority if the suggested priority exceeds the maximum allowable priority level, and otherwise the minimum allowable priority level.

After determining the call priority of the incoming call, the mobile phone may filter the incoming calls by comparing the call priority with the threshold priority as described above with respect to FIG. 6.

In another embodiment, users may set different categories of priorities, and the mobile phones may filter calls based on the different categories of priorities. For example, a user may set two categories of priorities: family and career. A contact (e.g., mother) may have a family priority of 4 and another contact (e.g. secretary) may have a career priority of 4. The user may set a business meeting with a business priority of 3 and a family priority of 5, and a family dinner with a business priority of 5 and a family priority of 3. As a result, incoming calls from the secretary will go through during the business meeting but not during the family dinner, and incoming calls from the mother will go through during the family dinner but not during the business meeting.

In one embodiment, users associate priority levels with caller. In this way, the priority level of a caller is applied to all phone numbers associated with the caller.

The disclosed system and methods beneficially enables mobile phones to filter incoming calls automatically based on priority with no or minimal user intervention. Because information needed for a mobile phone to conduct the filtering (e.g., caller ID, contact list, schedule/calendar information) are already available in many mobile phones, the system and method may be implemented with no or minimal additional support from mobile telephone service providers or mobile phone providers.

The disclosed systems and methods are not limited to mobile phones. Any communication device (e.g. Voice over Internet Protocol applications such as Skype, walkie-talkie) that is capable of accessing caller's identification and a time schedule may use the disclosed systems and/or methods to filter communications based on priority.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for filtering incoming calls based on priority. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for filtering incoming calls by a mobile communication device, the method being performed by one or more processors of the mobile communication device and comprising:
   receiving a user input;
   in response to receiving the user input, placing the mobile communications device in a priority mode for a period of time, wherein the priority mode is associated with a priority setting;
   during the period of time:
      receiving an incoming call from a caller;
      determining a call priority of the incoming call based on an identity of the caller;
      determining a threshold priority for a current time period based on the priority setting;
      determining whether the threshold priority for the current time period exceeds the call priority of the incoming call by comparing the threshold priority and the call priority; and
      responsive to determining that the threshold priority exceeds the call priority of the incoming call, blocking the incoming call; and
   after the period of time has elapsed, terminating the priority mode.

2. The method of claim 1, further comprising:
   responsive to determining that the threshold priority does not exceed the call priority of the incoming call, alerting a user of the mobile communication device of the incoming call.

3. The method of claim 1, wherein the mobile communication device is a mobile phone.

4. The method of claim 1, wherein determining the call priority of the incoming call comprises:
   identifying a telephone number of the incoming call;
   determining a priority level of the telephone number; and
   determining the priority level of the telephone number as the call priority of the incoming call.

5. The method of claim 1, further comprising:
   identifying a suggested priority of the incoming call, the suggested priority being set by the caller,
   wherein determining the call priority of the incoming call comprises:
      identifying a telephone number of the incoming call,
      determining an allowable range of call priorities of the telephone number, and
      determining the call priority of the incoming call based on the allowable range and the suggested priority.

6. The method of claim 5, wherein determining the call priority of the incoming call further comprises:
   responsive to the suggested priority being within the allowable range, determining the suggested priority as the call priority.

7. The method of claim 5, wherein determining the call priority of the incoming call further comprises:
   responsive to the suggested priority exceeding a maximum allowable priority level of the allowable range, determining the maximum allowable priority level as the call priority.

8. The method of claim 5, wherein determining the call priority of the incoming call further comprises:
   responsive to a minimum allowable priority level of the allowable range exceeding the suggested priority, determining the minimum allowable priority level as the call priority.

9. The method of claim 1, wherein blocking the incoming call comprises:
   determining time periods during which the incoming call would not be blocked based on the priority schedule;
   generating a message identifying the time periods; and
   sending the message to the caller.

10. The method of claim 1, wherein the priority schedule is imported from an external source.

11. A non-transitory computer readable medium with stored instructions, the instructions when executed by a processor cause the processor to perform a method comprising:
   receiving a user input;
   in response to receiving the user input, activating a priority mode for a period of time, wherein the priority mode is associated with a priority setting;
   during the period of time:
      receiving an incoming call from a caller;
      determining a call priority of the incoming call based on an identity of the caller;
      determining a threshold priority for a current time period based on the priority setting;
      determining whether the threshold priority for the current time period exceeds the call priority of the incoming call by comparing the threshold priority and the call priority; and
      responsive to determining that the threshold priority exceeds the call priority of the incoming call, blocking the incoming call; and
   after the period of time has elapsed, terminating the priority mode.

12. A mobile computing device comprising:
   a radio unit configured to communicate with a network;

a memory resource configured to store instructions; and a processing unit coupled to the radio unit and the memory resource, the processing unit configured to execute the instructions, wherein the instructions are configured to cause the processing unit to:

receive a user input;

in response to receiving the user input, place the mobile computing device in a priority mode for a period of time, wherein the priority mode is associated with a priority setting;

during the period of time:

receive an incoming call from a caller;

determine a call priority of the incoming call based on an identity of the caller;

determine a threshold priority for a current time period based on the priority setting;

determining whether the threshold priority for the current time period exceeds the call priority of the incoming call by comparing the threshold priority and the call priority; and responsive to determining that the threshold priority exceeds the call priority of the incoming call, block the incoming call; and after the period of time has elapsed, terminate the priority mode.

13. The mobile computing device of claim 12, wherein the instructions are further configured to cause the processing unit to alert a user of the incoming call in response to determining that the threshold priority does not exceed the call priority.

14. The mobile computing device of claim 12, wherein the instructions are further configured to cause the processing unit to identify a suggested priority of the incoming call, the suggested priority being set by the caller.

15. The mobile computing device of claim 14, wherein determining the call priority of the incoming call comprises:

identifying a telephone number of the incoming call;

determining an allowable range of the telephone number;

determining the call priority of the incoming call based on the allowable range of call priorities and the suggested priority; and responsive to the suggested priority being within the allowable range, determining the suggested priority as the call priority.

16. A method for filtering incoming calls by a mobile communication device, the method being performed by one or more processors of the mobile communication device and comprising:

receiving an incoming call from a caller;

identifying a suggested priority of the incoming call, the suggested priority being set by the caller;

determining a call priority of the incoming call based on an identity of the caller, wherein determining the call priority of the incoming call comprises: (i) identifying a telephone number of the incoming call, (ii) determining an allowable range of call priorities of the telephone number, and (iii) in response to the suggested priority being within the allowable range of call priorities, determining the suggested priority as the call priority;

determining a threshold priority for a current time period based on the priority schedule;

determining whether the threshold priority for the current time period exceeds the call priority of the incoming call by comparing the threshold priority and the call priority; and responsive to determining that the threshold priority exceeds the call priority of the incoming call, blocking the incoming call.

* * * * *